United States Patent
Takahashi et al.

(10) Patent No.: US 7,466,540 B2
(45) Date of Patent: Dec. 16, 2008

(54) IMAGE DISPLAY DEVICE

(75) Inventors: Toyoki Takahashi, Kanagawa (JP); Takuya Niitsu, Kanagawa (JP); Youhei Kobayashi, Saitama (JP); Yasunobu Kawasaki, Tokyo (JP); Shigesato Asai, Aichi (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 11/633,022

(22) Filed: Dec. 4, 2006

(65) Prior Publication Data
US 2007/0216702 A1 Sep. 20, 2007

(30) Foreign Application Priority Data
Dec. 8, 2005 (JP) ............................. 2005-355253

(51) Int. Cl.
*G06F 1/16* (2006.01)
(52) U.S. Cl. .................. 361/681; 345/87; 345/582; 345/905; 348/834; 348/E5.128
(58) Field of Classification Search ................. 361/681; 345/582
See application file for complete search history.

(56) References Cited

U.S. PATENT DOCUMENTS

| | | | | |
|---|---|---|---|---|
| 6,462,939 B1 * | 10/2002 | Heirich | ....................... | 361/682 |
| 7,120,011 B2 * | 10/2006 | Takahashi et al. | ........... | 361/681 |
| 7,129,919 B2 * | 10/2006 | Lee et al. | ....................... | 345/87 |
| 2004/0239619 A1 | 12/2004 | Takahashi et al. | | |
| 2005/0122439 A1 * | 6/2005 | Chang | ......................... | 348/834 |
| 2005/0286214 A1 * | 12/2005 | Chen | .......................... | 361/681 |
| 2006/0018092 A1 * | 1/2006 | Nagano | ...................... | 361/687 |
| 2006/0061945 A1 * | 3/2006 | Kim | .............................. | 361/681 |
| 2006/0077629 A1 * | 4/2006 | Shiraishi | ..................... | 361/681 |
| 2006/0082957 A1 * | 4/2006 | Chen | .......................... | 361/681 |

FOREIGN PATENT DOCUMENTS

JP 2004-72239 3/2004

* cited by examiner

*Primary Examiner*—Lisa Lea-Edmonds
(74) *Attorney, Agent, or Firm*—Finnegan, Henderson, Farabow, Garrett & Dunner, L.L.P.

(57) ABSTRACT

Disclosed herein is an image display device including a display panel having a flat display surface; a mounting frame having an opening for mounting the display panel in the condition that the display surface is exposed to the opening, the mounting frame having an outer transparent portion and an inner opaque portion; and a cover frame for covering at least the boundary between the transparent portion and the opaque portion of the mounting frame. At least a part of the transparent portion of the mounting frame is opposed to at least a part of the periphery of the display panel, thereby forming a clear portion allowing the vision to the rear side of the display panel.

12 Claims, 14 Drawing Sheets

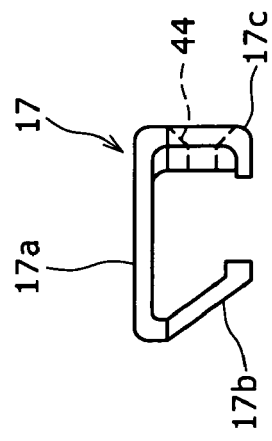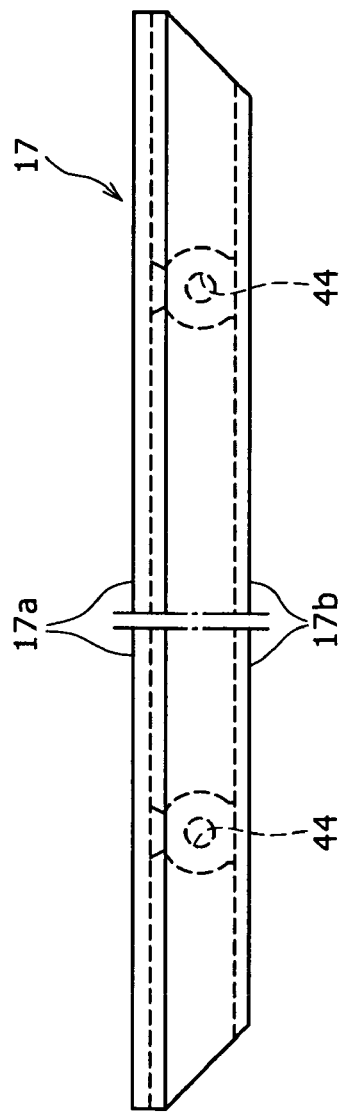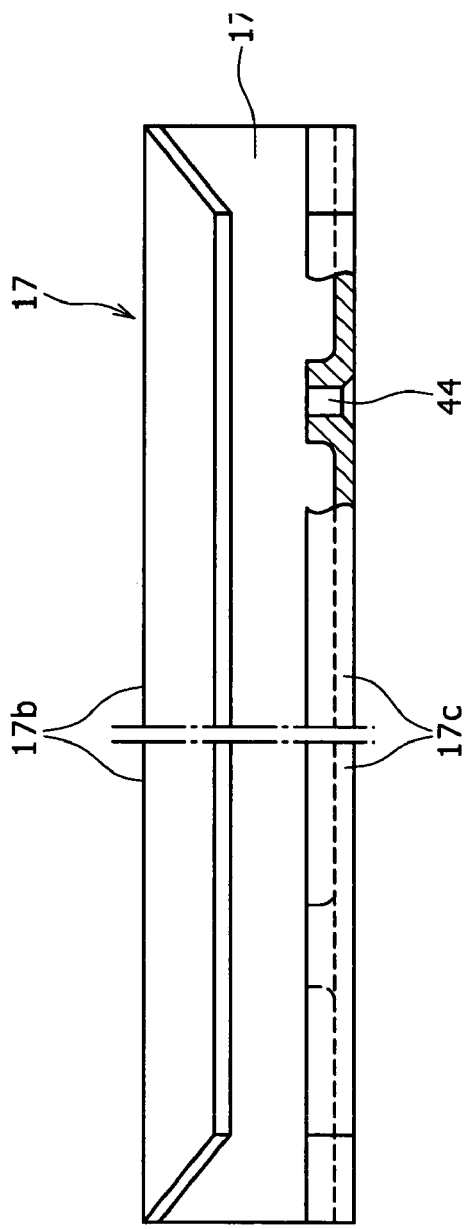

IMAGE DISPLAY DEVICE

CROSS REFERENCES TO RELATED APPLICATIONS

The present invention contains subject matter related to Japanese Patent Application JP 2005-355253 filed in the Japanese Patent Office on Dec. 8, 2005, the entire contents of which being incorporated herein by reference.

BACKGROUND OF THE INVENTION

1. Field of the Invention

The present invention relates to an image display device having a flat display panel such as a liquid crystal display and a plasma display.

2. Description of the Related Art

This kind of image display device is described in Japanese Patent Laid-open No. 2004-72239, for example. This publication discloses a flat-panel image display device for displaying images on a screen. This flat-panel image display device includes a bracket having a frame portion integrally formed of a transparent material, a body mounting portion provided at the inner edge of the frame portion, and a parts mounting portion provided on the outside of the frame portion; a flat front panel formed of a transparent material and located on the front side of the bracket; a body portion mounted on the body mounting portion of the bracket and having a screen surface; a holding member for holding the front panel and the bracket in their connected condition; and a functional portion mounted on the parts mounting portion of the bracket and located outside of the front panel for transmitting and receiving electrical signals to exhibit a predetermined function; wherein a signal line for effecting the transmission and reception of the electrical signals between the body portion and the functional portion is formed inside of the bracket or at the boundary between the front panel and the bracket.

According to the flat-panel image display device described in the above publication, the following effects can be obtained. The signal line is not exposed to the outside surface of the front panel or the bracket. Further, since the signal line is not exposed to the outside, no cover for the signal line is not necessary, so that the number of parts can be reduced to thereby reduce a manufacturing cost.

However, the above conventional flat-panel image display device includes the front panel, the bracket, and the body portion, wherein the bracket is located on the front side of the body portion, and the front panel is located on the front side of the bracket. Further, the front panel and the bracket are held in their connected condition by the holding member, and the body portion is mounted on the body mounting portion of the bracket by means of screws. As a result, pattern or color variations of the image display device are uniquely determined, and the user cannot freely select preferred pattern or color variations.

SUMMARY OF THE INVENTION

It is desirable to provide an image display device which can solve the above problem.

In accordance with the present embodiment of the invention, there is provided an image display device including a display panel having a flat display surface; a mounting frame having an opening for mounting the display panel in the condition that the display surface is exposed to the opening; the mounting frame having an outer transparent portion and an inner opaque portion; and a cover frame for covering at least the boundary between the transparent portion and the opaque portion of the mounting frame; at least a part of the transparent portion of the mounting frame being opposed to at least a part of the periphery of the display panel, thereby forming a clear portion allowing the vision to the rear side of the display panel.

According to an embodiment of the present invention, the image display device includes the display panel, the mounting frame, and the cover frame, wherein the transparent portion of the mounting frame is located in at least a part of the periphery of the display panel to form the clear portion allowing the vision to the rear side of the display panel. Accordingly, the display panel can be supported to the mounting frame in a so-called floating condition. Further, the cover frame can be easily changed to obtain preferred pattern or color variations, so that pattern or color variations of the image display device can be freely selected.

Thus, it is possible to provide a visual perception to the user such that the display panel is supported as if it is floating in the air owing to the clear portion. Further, abundant pattern or color variations of the color frame are prepared and the user can easily change the cover frame to thereby simply change the pattern or color of the image display device.

Other embodiments and features of the invention will be more fully understood from the following detailed description and appended claims when taken with the accompanying drawings.

BRIEF DESCRIPTION OF THE DRAWINGS

FIG. 11A is a side view of a rail member;

FIG. 11B is a bottom plan view of the rail member shown in FIG. 11A;

FIG. 11C is a front elevation of the rail member shown in FIG. 11A;

DETAILED DESCRIPTION OF THE PREFERRED EMBODIMENTS

Figure 1:
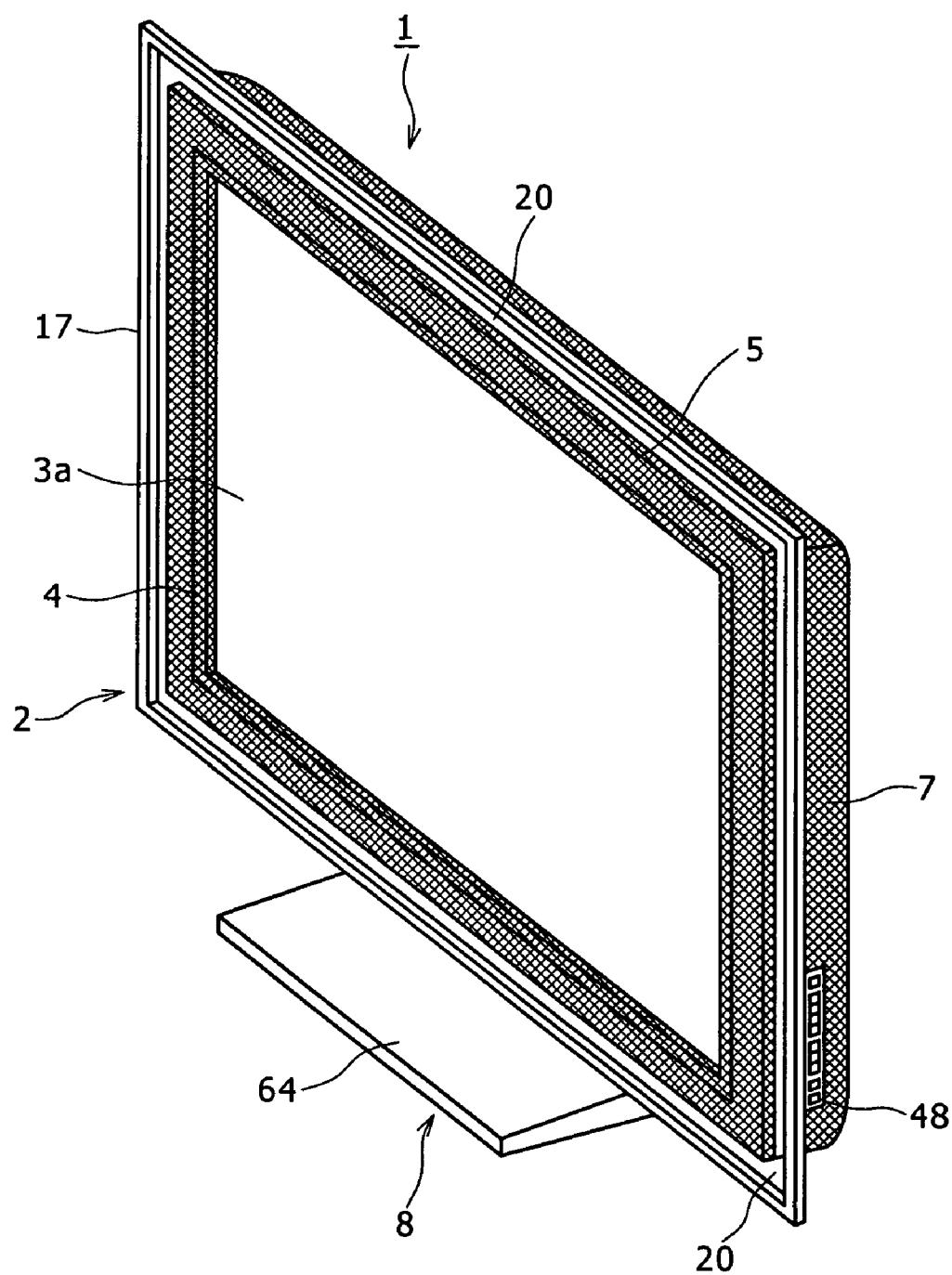
FIG. 1 is a perspective view of an image display device according to a preferred embodiment of the present invention as viewed from the front side thereof.

A preferred embodiment of the present invention will now be described with reference to the attached drawings.

FIGS. 1 to 15 show a liquid crystal display television 1 as a preferred embodiment of the image display device according to the present invention. The liquid crystal display television 1 is a so-called flat-panel image display device for displaying images as a television receiver. However, the image display device according to the embodiment of the present invention is not limited to the liquid crystal display television 1, but it is widely applicable to various image display devices such as a plasma display television and a projector.

As shown in FIGS. 1 to 4, the liquid crystal display television 1 is composed of a body portion 2 having a display panel unit 3 and a stand 8 for supporting the body portion 2 on the lower side thereof. The combination of the body portion 2 and the stand 8 constitute the stand-included liquid crystal display television 1 as shown, and only the body portion 2 except the stand 8 constitutes a wall-mountable liquid crystal display television.

The body portion 2 includes the display panel unit 3 having a display panel 3a, a mounting frame 4 for mounting the display panel unit 3, a cover frame 5 mounted on the mounting frame 4, a pair of right and left speaker units 6 mounted on the mounting frame 4, and a back cover 7 for covering the back surface of the display panel unit 3. The body portion 2 further includes a drive control device on the back surface of the display panel unit 3. The drive control device functions to control input electrical signals including image signals and sound signals, thereby displaying images on the screen of the display panel 3a and outputting sounds from speaker elements of the speaker units 6.

The display panel unit 3 includes the display panel 3a as a liquid crystal display panel, a frame member 9 for holding the display panel 3a so as to surround it, a backlight (not shown) provided inside of the frame member 9 so as to cover the back surface of the display panel 3a, and a base plate (not shown) for covering the back surface of the backlight. The drive control device is mounted on the back surface of the base plate. Although not shown, the drive control device is integrally configured so as to incorporate a power board having a power circuit and a circuit board having a drive circuit and other electrical circuits.

Figure 5:
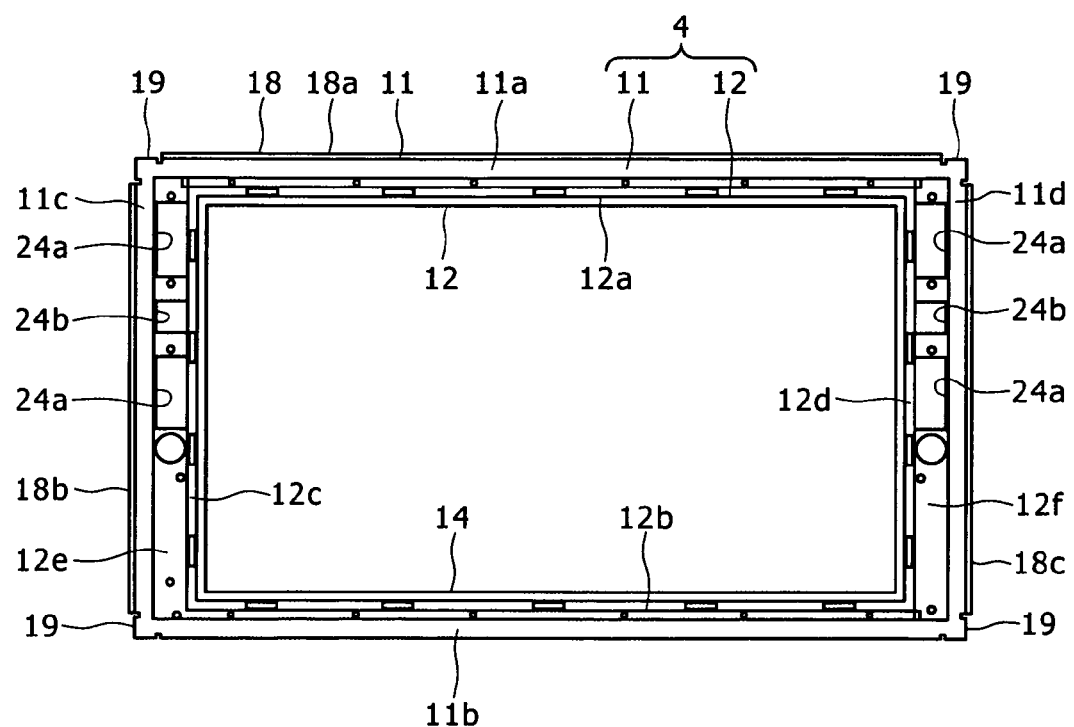
FIG. 5 is a front elevation of a mounting frame.
Figure 6:
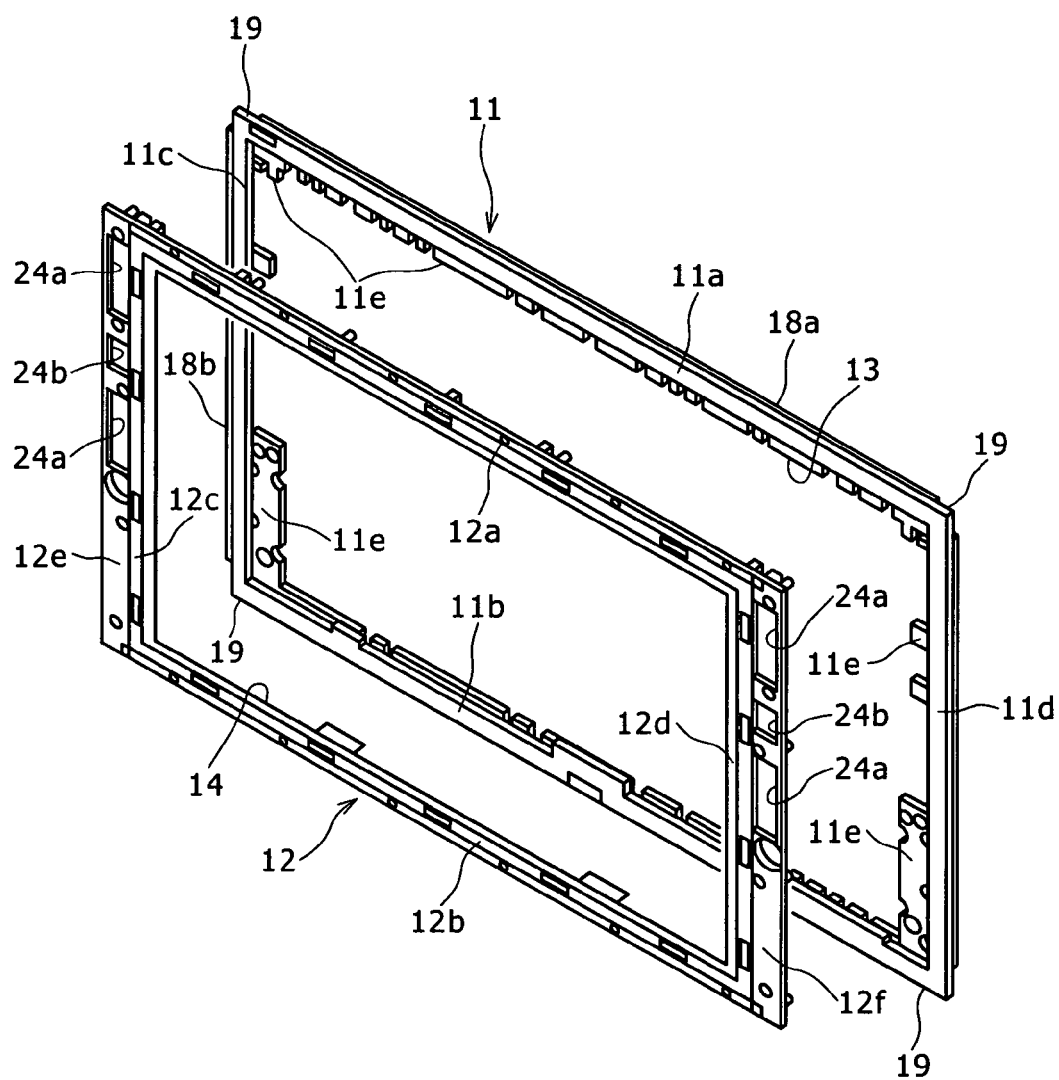
FIG. 6 is an exploded perspective view of the mounting frame shown in FIG. 5.
Figure 7:
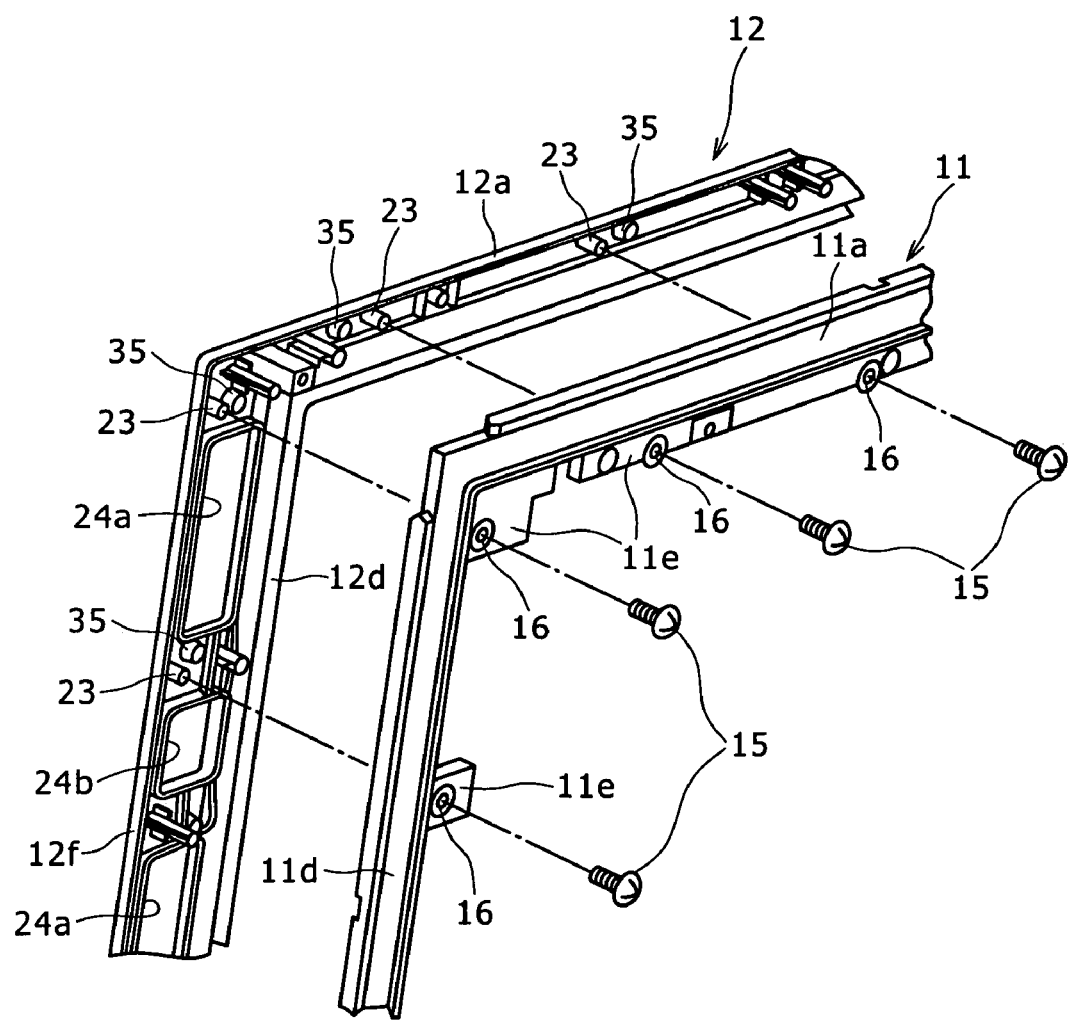
FIG. 7 is a perspective view of an essential part of the mounting frame as viewed from the rear side thereof.

As shown in FIGS. 5 to 7, the mounting frame 4 is composed of an outer frame 11 and an inner frame 12 slightly smaller in size than the outer frame 11. The outer frame 11 and the inner frame 12 are separate members, which are combined together to form the mounting frame 4. The outer frame 11 and the inner frame 12 are rectangular frames respectively having rectangular openings 13 and 14 of sizes corresponding to the size of the screen of the display panel 3a. The inner edge of the outer frame 11 and the outer edge of the inner frame 12 overlap each other, and the overlapping portions thereof are fastened together by means of a plurality of screws 15, thus integrating the outer frame 11 and the inner frame 12. The screen of the display panel 3a is exposed to the opening 14 of the inner frame 12.

As shown in FIG. 6, the outer frame 11 has a pair of upper and lower portions 11a and 11b extending horizontally in parallel and a pair of left and right portions 11c and 11d extending vertically in parallel. The inner edge of the outer frame 11 is formed with a plurality of flange portions lie projecting inward to mount the inner frame 12. The flange portions 11e are located at the four corners of the outer frame 11 and at other suitable positions spaced apart from each other along the inner edge of the outer frame 11. As shown in FIG. 7, each flange portion 11e is formed with at least one insert hole 16 for insertion of the threaded portion of each screw 15 for fixing the inner frame 12 to the outer frame 11.

As shown in FIGS. 5 and 6, the outer edge of the outer frame 11 is formed with a plurality of ridge portions 18 at all of the upper, left, and right portions 11a, 11c, and 11d except the lower portion 11b, so as to reinforce the outer frame 11 and also to mount a plurality of rail members 17 for hemming the outer edge of the outer frame 11. More specifically, the ridge portions 18 are composed of an upper ridge portion 18a formed along the upper portion 11a, a left ridge portion 18b formed along the left portion 11c, and a right ridge portion 18c formed along the right portion 11d. Thus, the lower portion 11b is not formed with the ridge portion 18 for the convenience of mounting of the rail member 17 thereto as will be hereinafter described.

The upper ridge portion 18a of the upper portion 11a of the outer frame 11 continuously extends along the outer edge of the upper portion 11a from the vicinity of the corner between the upper portion 11a and the left portion 11c to the vicinity of the corner between the upper portion 11a and the right portion 11d. The left and right upper ridge portions 18b and 18c also extend like the upper ridge portion 18a. Accordingly, four corner portions 19 as ridgeless flat portions are formed at the four corners of the outer edge of the outer frame 11. A corner member 46 to be hereinafter described is detachably mounted to each corner portion 19 of the outer frame 11. Further, the rail members 17 are respectively mounted to all of the upper, lower, left, and right portions 11a, 11b, 11c, and 11d of the outer frame 11.

Figure 9:
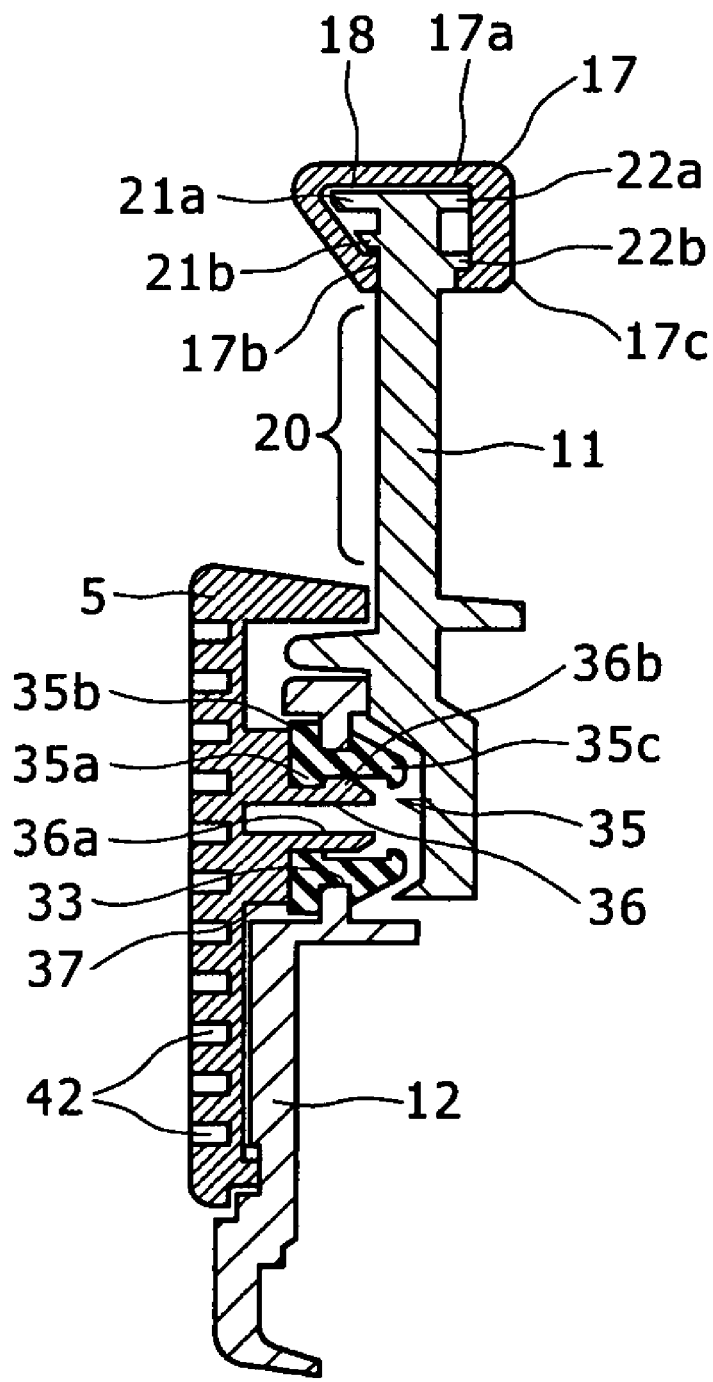
FIG. 9 is a sectional view of the mounting frame and the cover frame in their connected condition.
Figure 10:
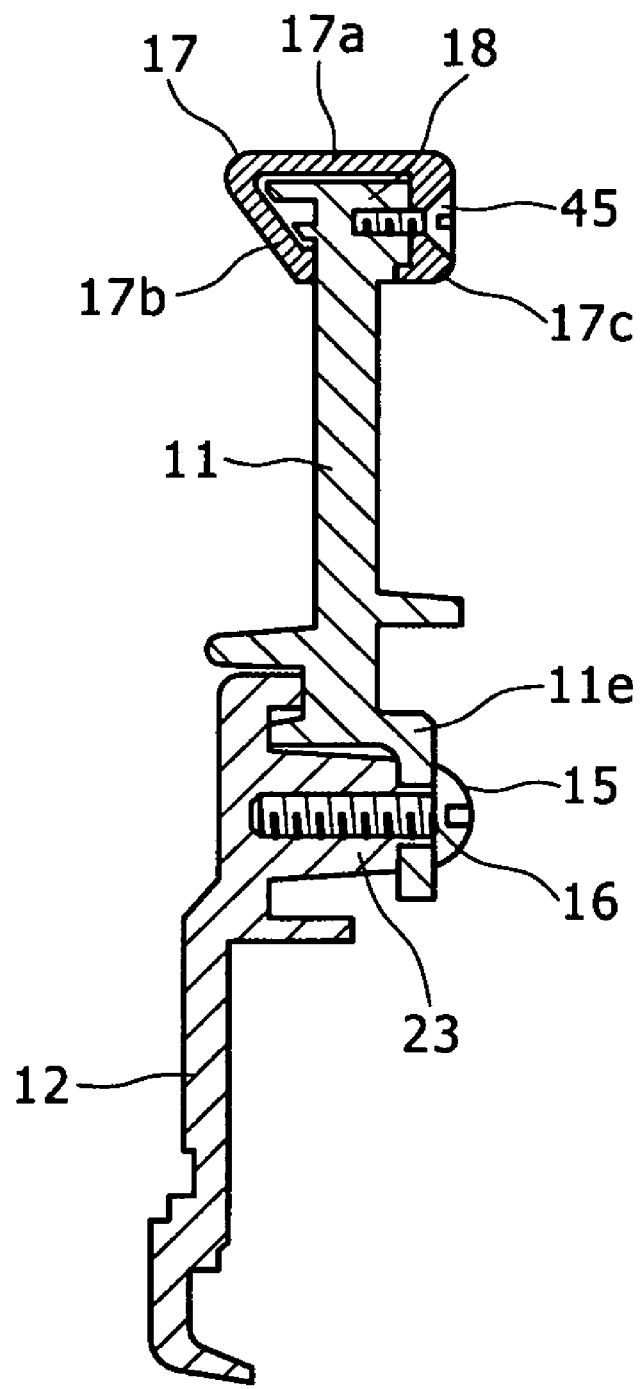
FIG. 10 is a sectional view of the mounting frame in its assembled condition.

As shown in FIGS. 9 and 10, each of the ridge portions 18a to 18c of the outer frame 11 includes two first rib portions 21a and 21b projecting from the front surface of the outer frame 11 and two second rib portions 22a and 22b projecting from the rear surface of the outer frame 11. The first rib portions 21a and 21b are spaced apart from each other and extend in parallel. Similarly, the second rib portions 22a and 22b are spaced apart from each other and extend in parallel. In this preferred embodiment, the second rib portions 22a and 22b have the same height, but the first rib portions 21a and 21b have different heights so that the inner rib portion 21b is lower in height than the outer rib portion 21a, thereby forming an inclined surface of each rail member 17 on the front side thereof. Further, each of the ridge portions 18a to 18c is formed with a plurality of screw holes for engaging screws 45 from the rear side to fix each rail member 17 to the outer frame 11. These screw holes are spaced apart from each other along the outer ridge of the outer frame 11.

The outer frame 11 is integrally formed of a transparent synthetic resin such as polycarbonate (PC) and acrylonitrile butadiene styrene resin (ABS) by injection molding or the like. In this case, the whole of the outer frame 11 is formed of a transparent synthetic resin, thereby forming a transparent portion as the outer portion of the mounting frame 4. As a modification, the outer frame 11 may be formed of a transparent synthetic resin and an opaque synthetic resin by two-color molding. For example, the outer portion of the outer frame 11 may be formed of a transparent synthetic resin to form a transparent portion of the mounting frame 4, and the inner portion of the outer frame 11 may be formed of an opaque synthetic resin to form an opaque portion of the mounting frame 4. Thus, only a part of the outer frame 11 may be formed as a transparent portion.

Similarly, the inner frame 12 has a pair of upper and lower portions 12a and 12b extending horizontally in parallel and a pair of left and right portions 12c and 12d extending vertically in parallel. Each of the upper, lower, left, and right portions 12a, 12b, 12c, and 12d of the inner frame 12 is formed with a plurality of boss portions 23 for fixing the outer frame 11 by means of the screws 15. The boss portions 23 are located along the outer edge of the inner frame 12 so as to be aligned to the insert holes 16 formed through the flange portions 11e of the outer frame 11. Each boss portion 23 is formed with a screw hole opening to the rear end (top end) thereof for engaging the screw 15.

The inner frame 12 further has a pair of left and right speaker mounting portions 12e and 12f for respectively mounting the left and right speaker units 6 on the horizontally outside of the left and right portions 12c and 12d, respectively. Each of the speaker mounting portions 12e and 12f is formed with a plurality of speaker holes 24a and 24b for exposing sound generating portions of speaker elements included in each speaker unit 6. More specifically, each of the speaker mounting portions 12e and 12f has two first speaker holes 24a for two bass speaker elements and one second speaker hole 24b for one treble speaker element.

In each of the speaker mounting portions 12e and 12f of the inner frame 12, the first speaker holes 24a are vertically spaced apart from each other, and the second speaker hole 24b is located between the first speaker holes 24a. In the assembled condition of the inner frame 12 and the outer frame 11, the left and right speaker mounting portions 12e and 12f are located horizontally inside of the left and right portions 11c and 11d of the outer frame 11, respectively. The left and right speaker units 6 are detachably mounted to the rear surfaces of the left and right speaker mounting portions 12e and 12f by any fixing means such as screws. The left and right speaker units 6 are symmetrical with each other in shape and configuration, and each speaker unit 6 has a speaker box 25 as shown in FIG. 13.

Figure 13:
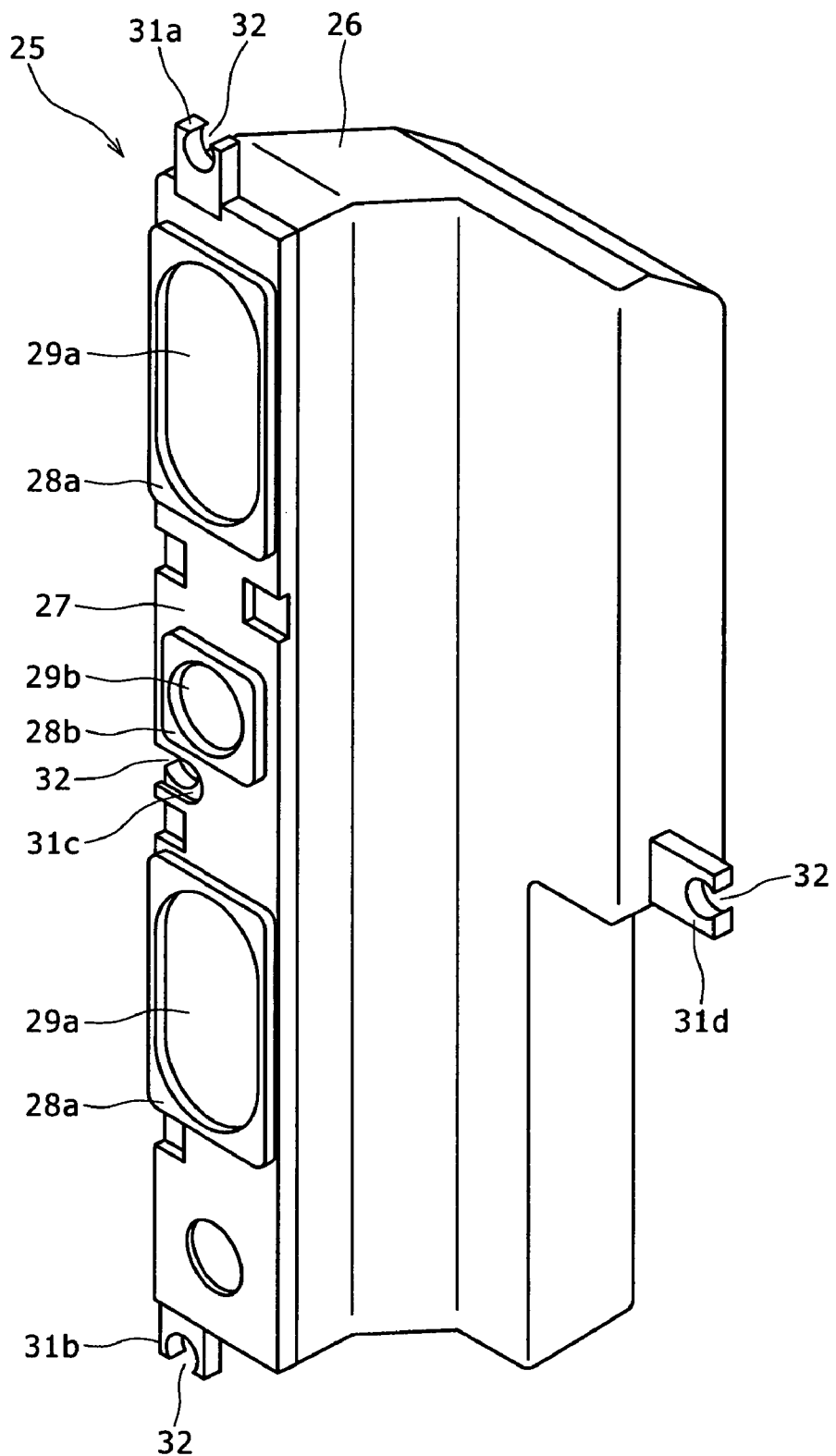
FIG. 13 is a perspective view of a speaker box.

Referring to FIG. 13, the speaker box 25 is composed of a box body 26 as a vertically elongated housing having a front opening and a front cover 27 for closing the front opening of the box body 26. The front cover 27 is provided with two bass speaker mounting portions 28a for respectively mounting the two bass speaker elements and a treble speaker mounting portion 28b for mounting the treble speaker element. These three speaker mounting portions 28a and 28b of the speaker box 25 of each speaker unit 6 respectively correspond in size and position to the three speaker holes 24a and 24b of each of the speaker mounting portions 12e and 12f of the inner frame 12.

More specifically, the two bass speaker mounting portions 28a are vertically spaced apart from each other, and the treble speaker mounting portion 28b is located between the two bass speaker mounting portions 28a. Each bass speaker mounting portion 28a is formed with a vertically elongated elliptical hole 29a, and the treble speaker mounting portion 28b is formed with a circular hole 29b. Each bass speaker element is fixedly mounted on each bass speaker mounting portion 28a by any fixing means such as screws in such a manner that a cone edge is seated on the inner surface around the elliptical hole 29a. Similarly, the treble speaker element is fixedly mounted on the treble speaker mounting portion 28b by any fixing means such as screws in such a manner that a cone edge is seated on the inner surface around the circular hole 29b.

The speaker box 25 of each speaker unit 6 has four brackets for mounting the speaker unit 6 to the inner frame 12. More specifically, the four brackets are composed of an upper bracket 31a provided at the upper end of the front cover 27, a lower bracket 31b provided at the lower end of the front cover 27, a central bracket 31c provided at a substantially vertically central portion of the front cover 27 in the longitudinal direction thereof, and a body bracket 31d provided at a substantially vertically central portion of the box body 26 horizontally opposite to the central bracket 31c. Each of the brackets 31a to 31d is formed with an insert hole 32 opening to the outside of the speaker box 25.

The speaker box 25 shown in FIG. 13 is designed for the left speaker unit 6 detachably mounted to the left speaker mounting portion 12e of the inner frame 12. Although not shown, the speaker box for the right speaker unit 6 is symmetrical with the speaker box 25 for the left speaker unit 6 in shape and configuration, and it is detachably mounted to the right speaker mounting portion 12f of the inner frame 12.

The inner frame 12 is formed with a plurality of through holes 33 for detachably mounting the cover frame 5. The through holes 33 are arranged at substantially equal intervals in the longitudinal direction of all the upper, lower, left, and right portions 12a, 12b, 12c, and 12d of the inner frame 12. A bushing 35 formed of rubber, plastic, etc. having elasticity is fitted to each through hole 33.

As shown in FIG. 9, the bushing 35 is composed of a cylindrical shaft portion 35a, an outward flange portion 35b formed at one axial end of the shaft portion 35a, and a stopper portion 35c formed at the other axial end of the shaft portion 35a. The stopper portion 35c has a conical shape as tapering from the bottom end thereof larger in diameter than the shaft portion 35a toward the top end from which the bushing 35 is inserted through the through hole 33. The shaft portion 35a is fitted to the through hole 33, thereby fixing the bushing 35 to the inner frame 12. In this condition, the flange portion 35b is opposed to the rear surface of the cover frame 5. The cover frame 5 has a plurality of engaging projection 36 adapted to be detachably fitted into the respective bushings 35 from the flange portions 35b side.

The inner frame 12 is integrally formed of an opaque synthetic resin such as polycarbonate (PC) and acrylonitrile butadiene styrene resin (ABS) by injection molding or the like. In this case, the whole of the inner frame 12 is formed of an opaque synthetic resin, thereby forming an opaque portion as the inner portion of the mounting frame 4. As a modification, the inner frame 12 may be first formed of a transparent synthetic resin, and an opaque coating may be next applied to the transparent resin molding obtained above, for example, thus finally obtaining an opaque resin molding as the inner frame 12.

Figure 2:
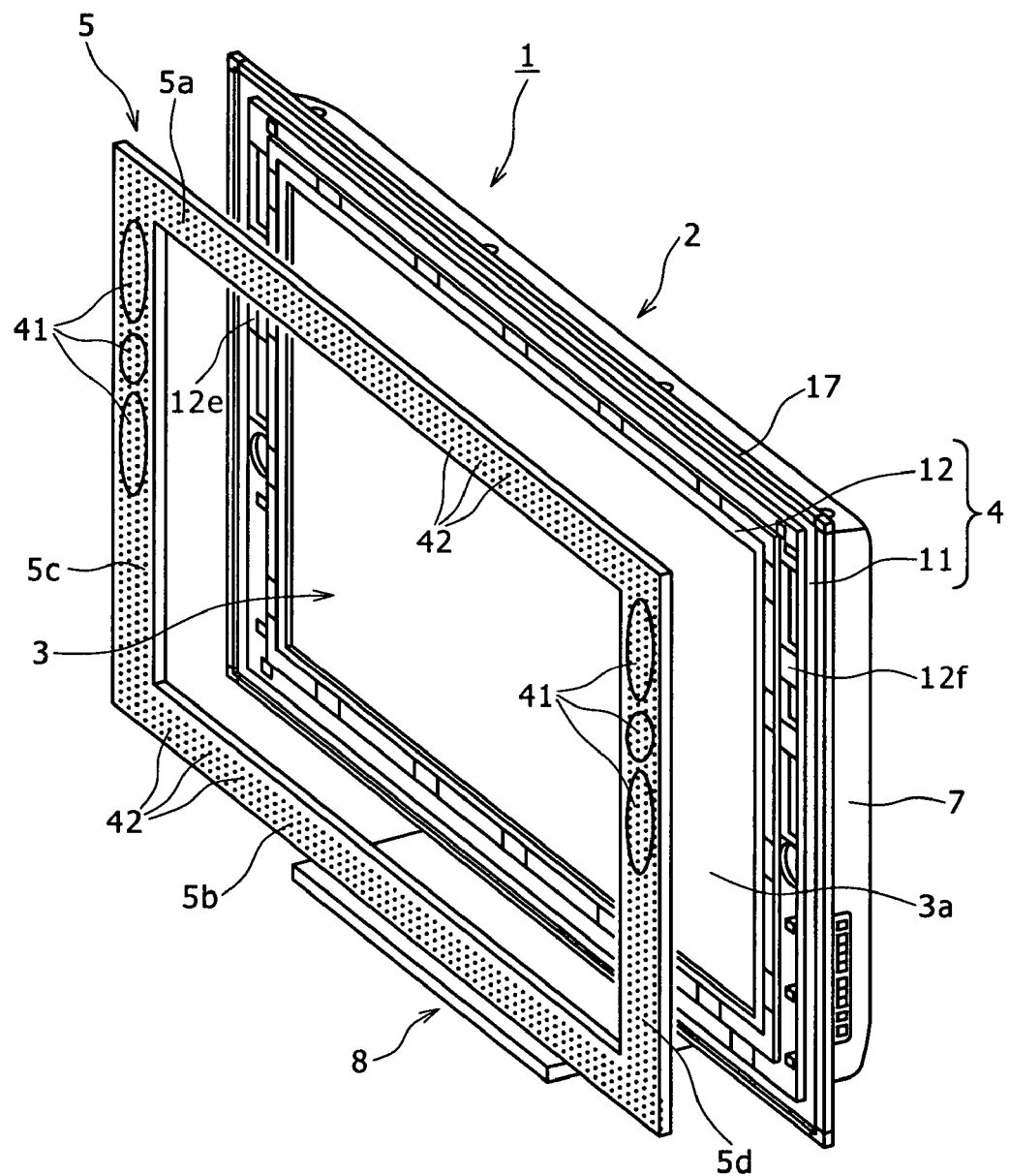
FIG. 2 is a view similar to FIG. 1 in the condition where a cover frame is removed.

The cover frame 5 is used mainly from the viewpoint of design for the primary purposes of improving an ornamental performance and allowing a novel design. However, the cover frame 5 serves also as a speaker grille. As shown in FIG. 2, the cover frame 5 has a pair of upper and lower portions 5a and 5b extending horizontally in parallel and a pair of left and right portions 5c and 5d extending vertically in parallel. As shown in FIG. 9, the cover frame 5 is a rectangular frame having a size slightly smaller than that of the outer frame 11 and slightly larger than that of the inner frame 12. That is, the size of the cover frame 5 is set so that it can conceal the boundary between the outer frame 11 and the inner frame 12.

Thus, the boundary between the transparent portion and the opaque portion of the mounting frame 4 or a region near this boundary can be covered with the cover frame 5, thereby allowing a novel design. Furthermore, by changing the cover frame 5 into a new cover frame having another color or pattern, a new image display device can be perceived in appearance. The rear surface of the cover frame 5 is formed with the same number of engaging projections 36 as that of the bushings 35 of the inner frame 12. The positions of the engaging projections 36 respectively correspond to the positions of the bushings 35.

Each engaging projection 36 projects from the center of a boss portion 37 formed on the rear surface of the cover frame 5, and has a slit 36a extending over the total height of the projection 36 and the boss portion 37 for the purpose of providing a suitable extent of elasticity. Further, each engaging projection 36 is formed at its front end portion on the rear side of the cover frame 5 with a radially outward projection 36b adapted to engage with the inner surface of the corresponding bushing 35. Accordingly, each engaging projection 36 is elastically fitted to the corresponding bushing 35, thereby providing a suitable force for holding the cover frame 5 to the inner frame 12 and accordingly preventing the unintentional removal of the cover frame 5. Thus, the engaging projections 36 of the cover frame 5 and the bushings 35 of the inner frame 12 constitute fastening means capable of detachably mounting the cover frame 5 to the mounting frame 4.

Figure 8:
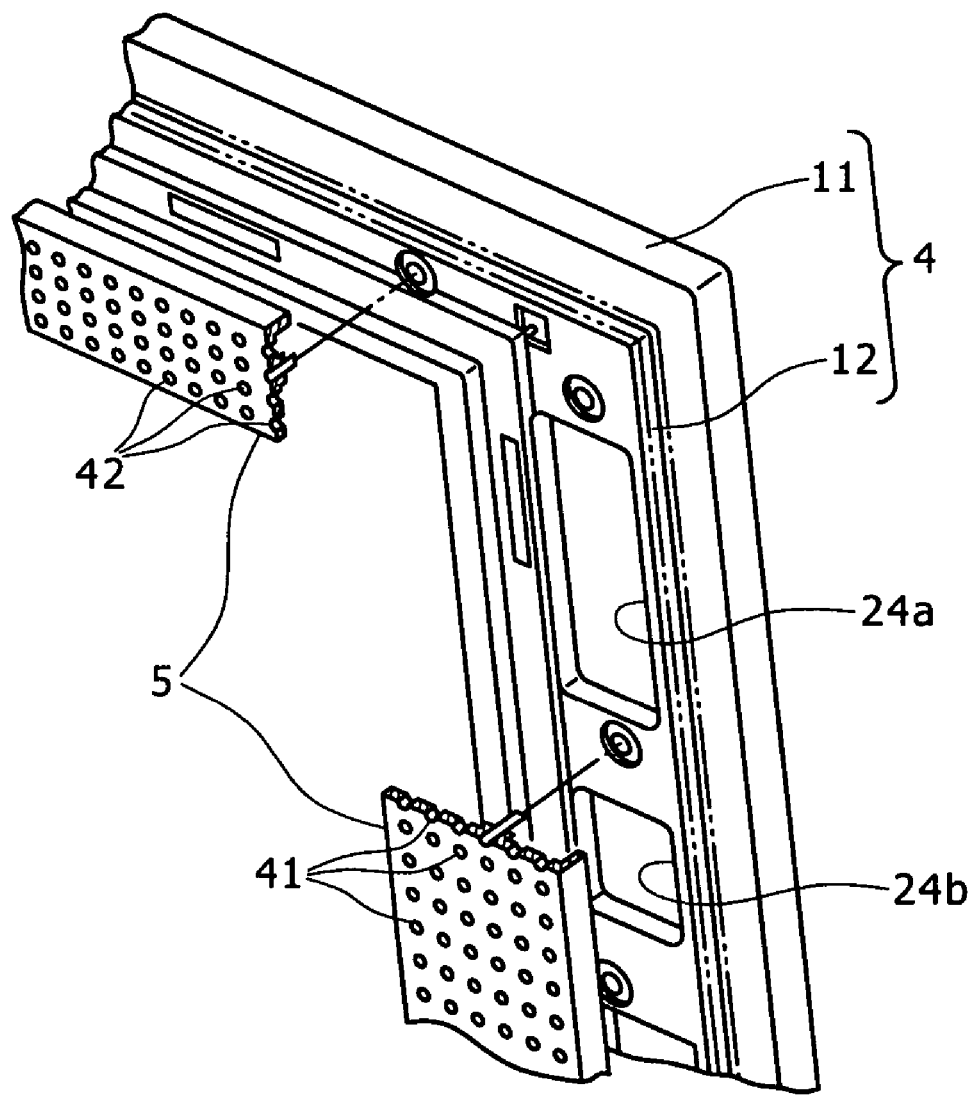
FIG. 8 is a perspective view of an essential part of the mounting frame and the cover frame as viewed from the front side thereof.

As shown in FIGS. 8, and 9, the front surface of the cover frame 5 is entirely formed with numerous fine through holes 41 extending through the thickness of the cover frame 5 and numerous fine blind holes 42 opening to only the front surface of the cover frame 5. The through holes 41 are formed to pass the sounds generated from the speaker elements to the front side of the liquid crystal display television 1, and each through hole 41 has a small diameter allowing the pass of the sounds. For example, the diameter of each through hole 41 is suitably set to 1 to 2 mm. On the other hand, the blind holes 42 are formed to imitate the through holes 41. That is, although the blind holes 42 do not pass the sounds generated from the speaker elements, these holes 42 are formed for the primary purpose of providing a visual perception as if speaker elements are present behind the blind holes 42 to generate the sounds through the blind holes 42. To this end, the diameter of each blind hole 42 is preferably set similar to that of each through hole 41. For example, the diameter of each blind hole 42 is suitably set to 1 to 2 mm.

In view of the above-mentioned functions (characteristics) of the through holes 41 and the blind holes 42, the through holes 41 are formed at some regions opposed to the sound generating portions (e.g., the front surface of the cones) of the speaker elements of the left and right speaker units 6 mounted on the speaker mounting portions 12e and 12f of the inner frame 12, whereas the blind holes 42 are formed at the other region except the above regions where the through holes 41 are formed. The through holes 41 and the blind holes 42 are arranged at equal intervals (e.g., 2 to 3 mm) both in the vertical direction and in the horizontal direction. As a modification, the through holes 41 and the blind holes 42 may be arranged in a staggered manner or may be arranged in a random fashion.

The cover frame 5 having such a shape and configuration is preferably integrally formed of synthetic resin such as polycarbonate (PC) and acrylonitrile butadiene styrene resin (ABS) by injection molding or the like. However, metal materials such as aluminum may be used instead of synthetic resin. The synthetic resin forming the cover frame 5 in this preferred embodiment may be transparent or opaque. The color of the cover frame 5 may be the same as the color of the material itself for the cover frame 5. In view of the use object, function, etc. of the cover frame 5 including its design and ornamental performance, a similar cover frame coated in a suitable color, plated with metal, or decorated with a suitable pattern may be substituted according to the preferences of the user.

By the combination of the cover frame 5, the outer frame 11, and the inner frame 12, it is possible to provide a clear portion for making the rear side of the mounting frame 4 visible and an unclear portion for concealing the rear side of the mounting frame 4. In this preferred embodiment, the clear portion is provided by an intermediate transparent portion of only the outer frame 11 except an inner transparent portion covered with the cover frame 5 and an outer transparent portion covered with the rail members 17. More specifically, the clear portion is provided by a rectangular transparent clear portion 20 formed along the outer edge of the cover frame 5.

While the outer frame 11 is formed of a transparent material and the inner frame 12 is formed of an opaque material to configure the mounting frame 4 in this preferred embodiment, the configuration of the mounting frame 4 is not limited to the above in the present invention. For example, the outer frame 11 and the inner frame 12 may be integrally formed by injection molding or the like to configure an integral mounting frame. In this case, the transparent portion and the opaque portion of the mounting frame may be formed by two-color injection molding using a transparent synthetic resin and an opaque synthetic resin. As another modification, the transparent portion and the opaque portion of the mounting frame may be formed by first forming the whole of the mounting frame from a transparent synthetic resin and next applying an opaque coating or plating to a part of the transparent mounting frame to thereby form the opaque portion.

FIGS. 11A to 11C show the configuration of each rail member 17 mounted on the outer edge of the outer frame 11. Each rail member 17 is composed of a top plate portion 17a adapted to be opposed to the outer surface of each of the ridge portions 18a to 18c of the outer frame 11 and a pair of side plate portions 17b and 17c projecting from the transversely opposite side edges of the top plate portion 17a. The top plate portion 17a has such a width as to cover the outer surface of each of the ridge portions 18a to 18c. The first side plate portion 17b projects from one transversely side edge of the top plate portion 17a toward the bottom side thereof in such a manner as to be inclined inward at a suitable angle (e.g., 45 to 60 degrees), whereas the second side plate portion 17c projects from the other transversely side edge of the top plate portion 17a toward the bottom side thereof so as to be bent about 90 degrees.

The first side plate portion 17b is opposed to the front surface of the outer frame 11, and the second side plate portion 17c is opposed to the rear surface of the outer frame 11. Thus, an elongated space is defined so as to be surrounded by the top plate portion 17a and the first and second side plate portions 17b and 17c, and each of the ridge portions 18a to 18c is inserted into this elongated space. As mentioned above, each of the ridge portions 18a to 18c has the first rib portions 21a and 21b projecting on the front side and the second rib portions 22a and 22b projecting on the rear side. Further, the bottom ends of the first and second side plate portions 17b and 17c of each rail member 17 are engaged with the first and second rib portions 21b and 22b of each ridge portion 18, thereby preventing the removal of each rail member 17 in a direction perpendicular to the longitudinal direction of each ridge portion 18.

The shape of each rail member 17 corresponds to the shape of each ridge portion 18. Accordingly, by sliding each rail member 17 in the direction of extension of each ridge portion 18, each rail member 17 can be easily fitted to the corresponding ridge portion 18. Such a method of mounting each rail member 17 is applied to the upper, left, and right portions 11a, 11c, and 11d of the outer frame 11 respectively having the ridge portions 18a, 18b, and 18c. The lower portion 11b of the outer frame 11 is not formed with such a ridge portion, but has flat surfaces on the front and rear sides. Accordingly, the rail member 17 can be fitted to the lower portion 11b from its lower side.

Figure 3:
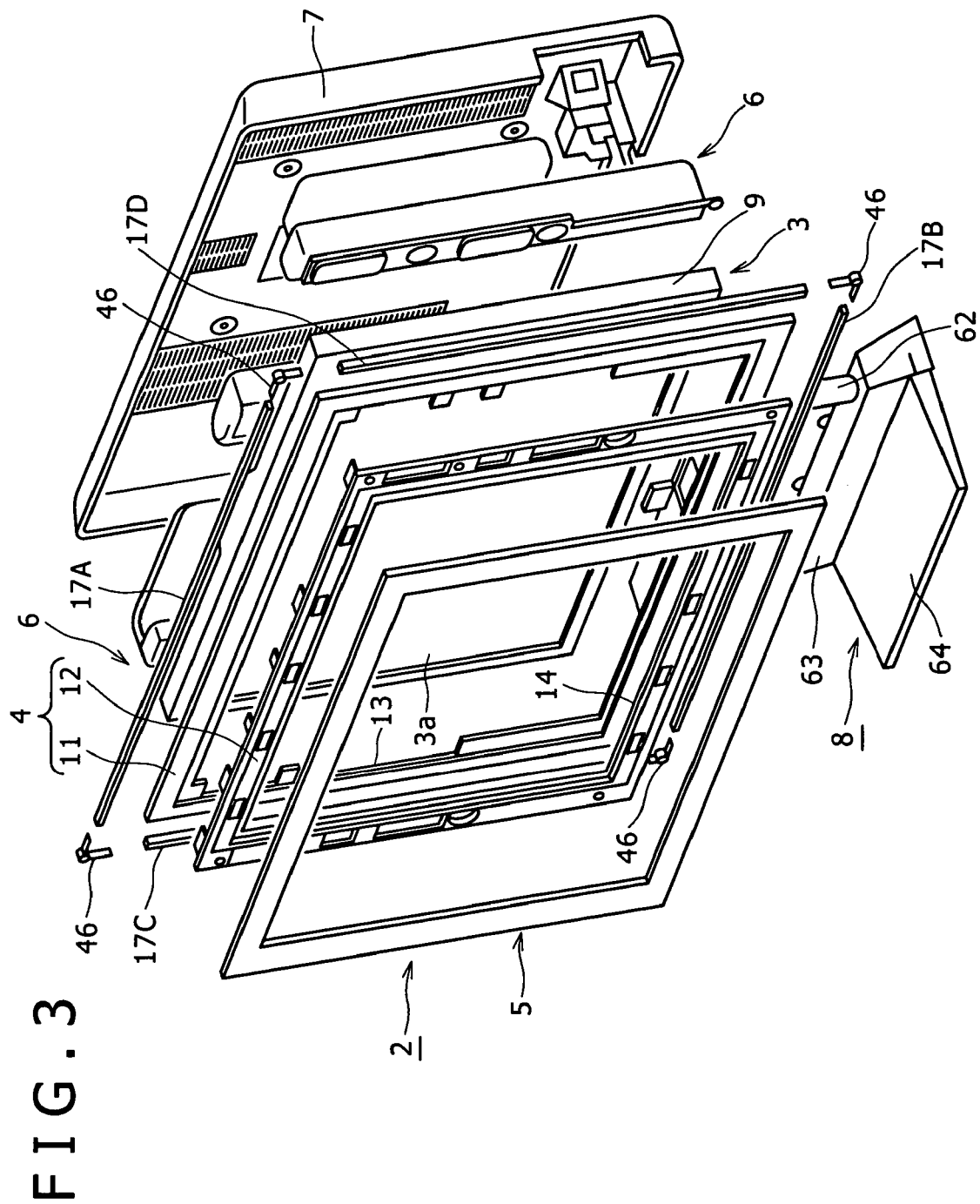
FIG. 3 is an exploded perspective view of the image display device shown in FIG. 1.

Further, the second side plate portion 17c of each rail member 17 is formed with a plurality of insert holes 44 arranged at given intervals in the longitudinal direction of the second side plate portion 17c as shown in FIGS. 11A to 11C. These insert holes 44 are formed to insert screws 45 (see FIG. 10) for fixing each rail member 17 to the corresponding ridge portion 18. As shown in FIG. 10, the threaded portion of each screw 45 inserted through the corresponding through hole 44 is tightly screwed into a threaded hole formed on the rear surface of each ridge portion 18, thus fixing each rail member 17 to each of the upper, lower, left, and right portions 11a, 11b, 11c, and 11d of the outer frame 11. That is, the totally four rail members 17 are used so as to correspond to the four portions 11a to 11d of the outer frame 11. As shown in FIG. 3, the four rail members 17 are composed of a pair of upper and lower rail members 17A and 17B respectively fitted to the upper and lower portions 11a and 11b of the outer frame 11 and a pair of left and right rail members 17C and 17D respectively fitted to the left and right portions 11c and 11d of the outer frame 11.

Figure 12A:
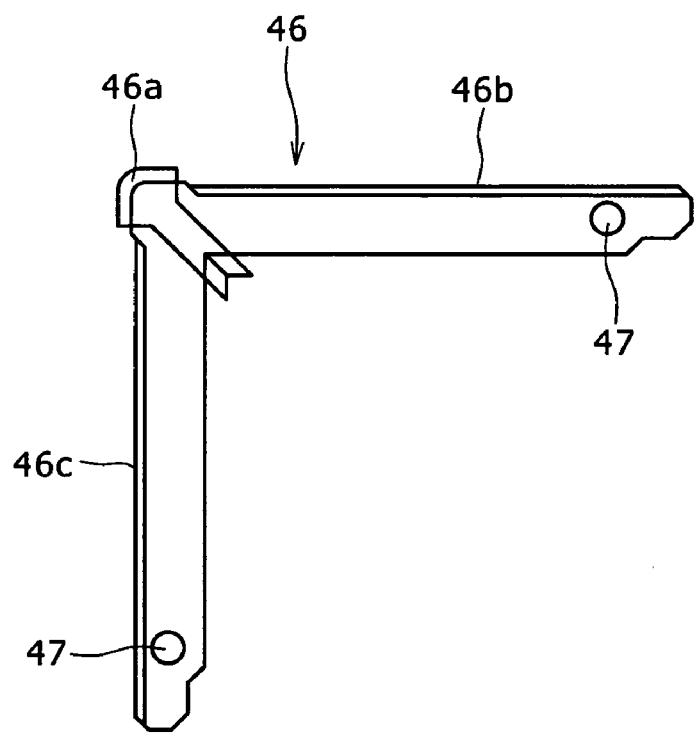
FIG. 12A is a top plan view of a corner member.
Figure 12B:
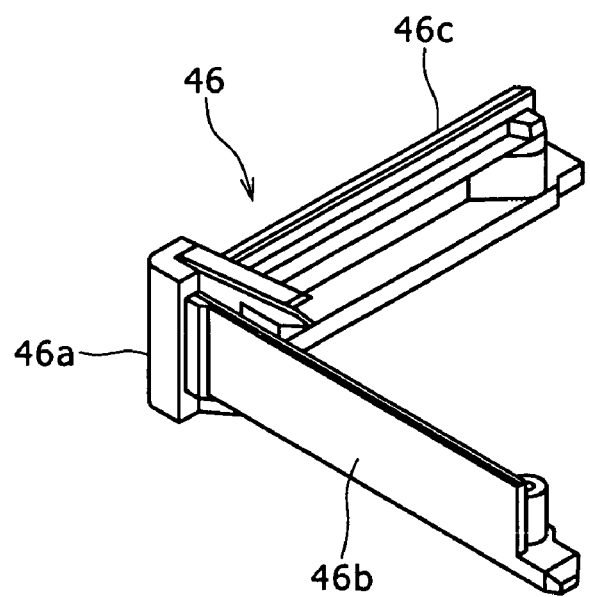
FIG. 12B is a perspective view of the corner member shown in FIG. 12A.

Four corner members 46 are mounted on the four corner portions 19 of the outer frame 11, respectively. As shown in FIGS. 12A and 12B, each corner member 46 is composed of a corner portion 46a adapted to be fitted to the corner of each corner portion 19 and a pair of arm portions 46b and 46c extending from the corner portion 46a in perpendicular directions corresponding to the directions of extension of the outer edges of each corner portion 19 forming 90 degrees. The end portions of the adjacent rail members 17 are inserted into the arm portions 46b and 46c, and the end surfaces of these rail members 17 abuts against the opposite end surfaces of the corner portion 46a.

The arm portions 46b and 46c of each corner member 46 are formed with insert holes 47 for insertion of the threaded portions of screws for fixing each corner member 46 to the corresponding corner portion 19 of the outer frame 11. Thus, the outer edge of the outer frame 11 is entirely hemmed by the four corner members 46 and the four rail members 17A to 17D. The rail members 17 and the corner members 46 are preferably formed of aluminum alloy, for example. However, any other metals or engineering plastics may be used for the material of the rail members 17 and the corner members 46.

Figure 4:
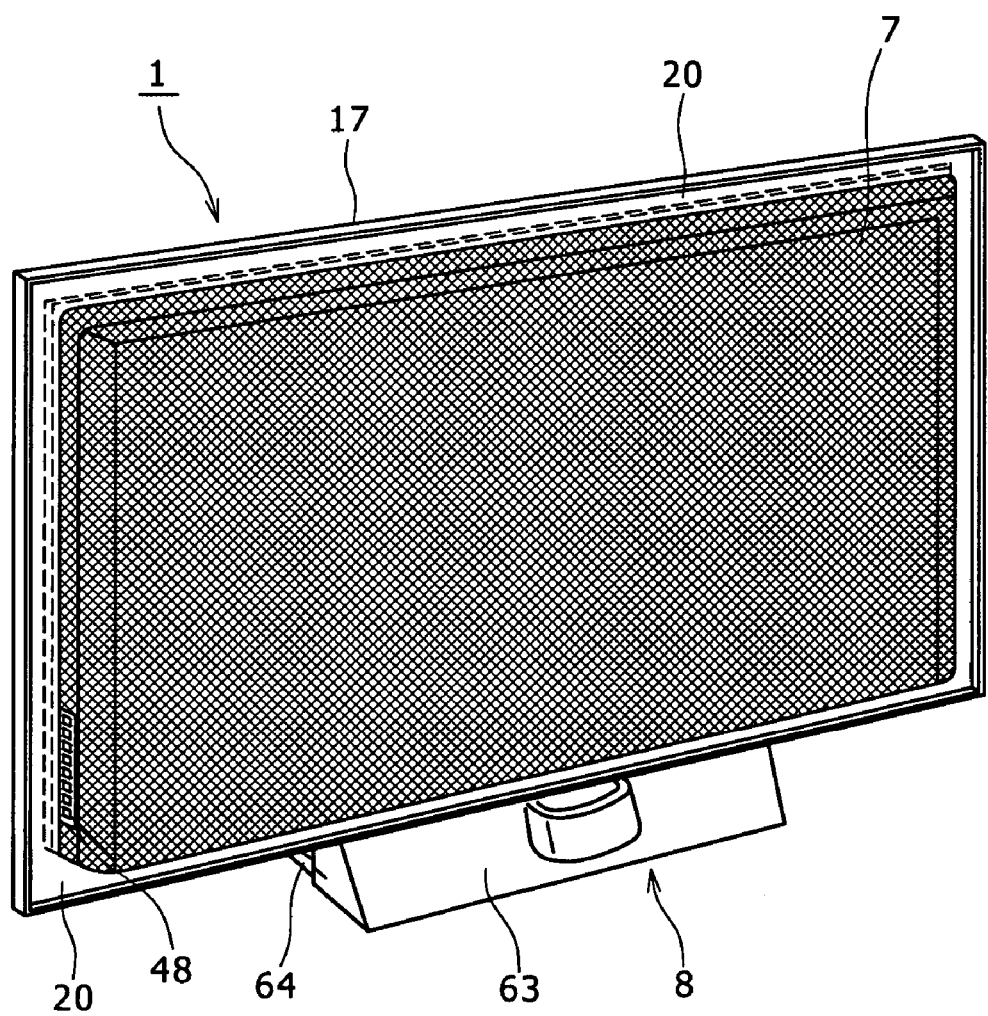
FIG. 4 is a perspective view of the image display device as viewed from the rear side thereof.

The back cover 7 is detachably mounted to the back surface of the outer frame 11 whose outer edge is hemmed by the rail members 17 and the corner members 46, by using suitable fixing means such as screws. The back cover 7 serves to cover and protect the display panel unit 3 mounted on the back surface of the outer frame 11. As shown in FIGS. 1 and 4, one side surface of the back cover 7 is formed with an opening 48 for exposing various connection terminals and leading a power cord.

The body portion 2 having the above-mentioned configuration can be assembled simply in the following manner. First, the display panel unit 3 is constructed by surrounding the display panel 3a with the frame member 9 and mounting the backlight on the back surface of the display panel 3a. Thereafter, the drive control device is mounted on the display panel unit 3.

The mounting frame 4 is next constructed by combining the outer frame 11 and the inner frame 12. As shown in FIGS. 6 and 7, the inner frame 12 is placed in front of the outer frame 11, and the outer edge of the inner frame 12 is laid on the inner edge of the outer frame 11. In this condition, as shown in FIG. 10, the flange portions 11e of the outer frame 11 and the boss portions 23 of the inner frame 12 are superimposed on each other, and the insert holes 16 of the flange portions lie are aligned to the screw holes of the boss portions 23, respectively. In this condition, the threaded portions of the screws 15 are inserted through the insert holes 16 and screwed into the screw holes of the boss portions 23. Thus, the outer frame 11 and the inner frame 12 can be firmly fixed to each other by the screws 15.

The display panel unit 3 is next fixed to the back surface of the mounting frame 4 constructed above, by using suitable fixing means such as screws. The speaker units 6 are next placed on the left and right sides of the display panel unit 3 and fixed to the back surface of the mounting frame 4 by using suitable fixing means such as screws. The back cover 7 is next fixed by screws to the back surface of the mounting frame 4 to cover the back side of the display panel unit 3.

After or before fixing the display panel unit 3 to the mounting frame 4, the rail members 17 and the corner members 46 are mounted to the entire outer edge of the outer frame 11. The mounting work for the rail members 17 and the corner members 46 to the outer frame 11 will now be described more specifically. First, the upper rail member 17A is mounted to the upper ridge portion 18a formed along the upper edge of the outer frame 11. This mounting work is performed by making one longitudinal end of the upper rail member 17A be opposed to one horizontal end of the upper ridge portion 18a, aligning the elongated space of the upper rail member 17A to the upper ridge portion 18a, and horizontally sliding the upper rail member 17A along the upper ridge portion 18a so as to enclose the same. As a result, the upper rail member 17A is mounted to the upper edge of the outer frame 11 as being guided by the upper ridge portion 18a. The upper rail member 17A is positioned at the substantially central portion of the upper edge of the outer frame 11.

The corner members 46 are next mounted to the opposite corner portions of the upper edge of the outer frame 11. This mounting work is performed by horizontally sliding one of the two arm portions 46b and 46c of each corner member 46 into the inside space of the upper rail member 17A until the corner portion 46a of each corner member 46 comes into abutment against the upper rail member 17A. Thus, the two corner members 46 are positioned at the opposite corner portions of the upper edge of the outer frame 11.

The left and right rail members 17C and 17D are next mounted to the left and right edges of the outer frame 11, respectively. This mounting work for the left rail member 17C to the outer frame 11 is performed by making the upper end of the left rail member 17C be opposed to the lower end of the left ridge portion 18b formed along the left edge of the outer frame 11, aligning the elongated space of the left rail member 17C to the left ridge portion 18b, and vertically sliding the left rail member 17C along the left ridge portion 18b from the lower end thereof so as to enclose the same. At a result, the left rail member 17C is mounted to the left edge of the outer frame 11 as being guided by the left ridge portion 18b until the upper end of the left rail member 17C comes into abutment against the corner member 46 mounted at the left upper corner of the outer frame 11. Similarly, the right rail member 17D is mounted to the outer frame 11 by making the upper end of the right rail member 17D be opposed to the lower end of the right ridge portion 18c formed along the right edge of the outer frame 11, aligning the elongated space of the right rail member 17D to the right ridge portion 18c, and vertically sliding the right rail member 17D along the right ridge portion 18c from the lower end thereof so as to enclose the same. As a result, the right rail member 17D is mounted to the right edge of the outer frame 11 as being guided by the right ridge portion 18c until the upper end of the right rail member 17D comes into abutment against the corner member 46 mounted at the right upper corner of the outer frame 11.

The other corner members 46 are next mounted to the opposite corner portions of the lower edge of the outer frame 11. This mounting work is performed by vertically sliding one of the two arm portions 46b and 46c of each corner member 46 into the inside space of each of the left and right rail members 17C and 17D until the corner portion 46a of each corner member 46 comes into abutment against each of the left and right rail members 17C and 17D. Thus, the two corner members 46 are positioned at the opposite corner portions of the lower edge of the outer frame 11.

The lower rail member 17B is next mounted to the lower edge of the outer frame 11. This mounting work is performed by exposing the elongated opening of the inside space of the lower rail member 17B to the lower edge of the outer frame 11 and next upward moving the lower rail member 17B to fit it to the lower edge of the outer frame 11. At the same time, the other arm portions of the two corner members 46 mounted at the opposite corner portions of the lower edge of the outer frame 11 are also fitted into the inside space of the lower rail member 17B because the width of each arm portion is equal to the width of the lower edge of the outer frame 11.

After mounting all of the four rail members 17 to the outer frame 11 as mentioned above, the rail members 17 are fixed to the outer frame 11 by means of the screws 45. Alternatively, just after mounting each rail member 17 to the outer frame 11, this rail member 17 may be fixed to the outer frame 11 by means of the screws 45. Thus, the outer edge of the outer frame 11 is entirely hemmed by the four rail members 17 in the condition where the corner members 46 are positioned at the four corners of the outer frame 11.

The cover frame 5 is next mounted to the mounting frame 4. As shown in FIG. 8, the cover frame 5 is first placed in front of the mounting frame 4. As shown in FIG. 9, the plural engaging projections 36 formed on the rear surfaces of the upper, lower, left, and right portions 5a, 5b, 5c, and 5d of the cover frame 5 are fitted into the respective bushings 35 of the inner frame 12 of the mounting frame 4. More specifically, all of the engaging projections 36 are aligned to the respective bushings 35, and the whole of the cover frame 5 is pressed on the inner frame 12. As a result, the bushings 35 are elastically deformed by the engaging projections 36 to receive the same, and the radially outward projection 36b formed at the front end of each engaging projection 36 comes into engagement with the inner surface of each bushing 35. Accordingly, the cover frame 5 is held to the front surface of the mounting frame 4 by a suitable force.

This mounting work (similarly, a demounting work) for the cover frame 5 can be performed very simply not only by a skilled worker, but also by a general user. The cover frame 5 occupies a large area around the screen to form a conspicuous portion. Accordingly, by changing the color, pattern, etc. of this conspicuous portion, the design of the liquid crystal display television 1 can be largely changed. Further, the cover frame 5 can be mounted and demounted simply by the user. Accordingly, when changing the cover frame 5, the user can enjoy watching and listening with a visual perception such that the liquid crystal display television 1 has been changed to a new one. For example, the replacement of the cover frame 5 can be simply performed by pulling the cover frame 5 at two diagonally opposite positions simultaneously or sequentially.

As shown in FIGS. 1 and 4, the display panel 3a is generally surrounded by the mounting frame 4 and hemmed in color of the opaque inner frame 12 forming the inner portion of the mounting frame 4. In contrast, the outer frame 11 forming the outer portion of the mounting frame 4 is transparent, and it is formed so as to entirely surround the inner frame 12. Further, the four rail members 17 are mounted on the four straight portions of the outer edge of the outer frame 11, and the four corner members 46 are mounted on the four corner portions of the outer edge of the outer frame 11. Accordingly, the outer edge of the outer frame 11 is hemmed in color of the rail members 17 and the corner members 46.

Thus, the mounting frame 4 for holding the display panel unit 3 is constructed by an inner opaque portion formed by the opaque inner frame 12, an intermediate transparent portion formed by the transparent outer frame 11 surrounding the inner frame 12, and an outer opaque portion formed by the opaque rail members 17 and the opaque corner members 46 surrounding the outer frame 11. Further, the cover frame 5 is mounted on the mounting frame 4 as mentioned above. With this arrangement, it is possible to provide a floating condition such that the display panel 3a appears to be floating in the air owing to the presence of the clear portion 20 around the display panel 3a. Such a floating condition of the display panel 3a can contribute to creation of a new design in this kind of image display device and also to improvement in flexibility and creativity of design.

As mentioned above, the cover frame 5 is mounted on the front surface of the mounting frame 4, and the speaker units 6 are mounted on the rear surface of the mounting frame 4, so that the front surface of each speaker element in the speaker units 6 is covered with the cover frame 5. However, the cover frame 5 has the numerous through holes 41 for allowing the pass of the sounds generated from each speaker element. Accordingly, the cover frame 5 does not interfere with each speaker element, but reliably allows the radiation of the sounds from each speaker element. Moreover, the cover frame 5 has a suitable rigidity, so that it can reliably perform the function as a cover for each speaker element.

Further, the numerous blind holes 42 imitating the through holes 41 are formed over the front surface of the cover frame 5. Accordingly, it is possible to provide a visual perception as if the sounds from each speaker element are radiated from the whole of the periphery of the display panel 3a. As a result, the user can obtain a multisound-like perception to enjoy a realistic virtual acoustic effect.

When the cover frame 5 is mounted to the mounting frame 4, the assembling work for the body portion 2 is finished. In this condition, the liquid crystal display television 1 without the stand 8 is obtained, and it is used as a wall-mountable television, for example.

Figure 14:
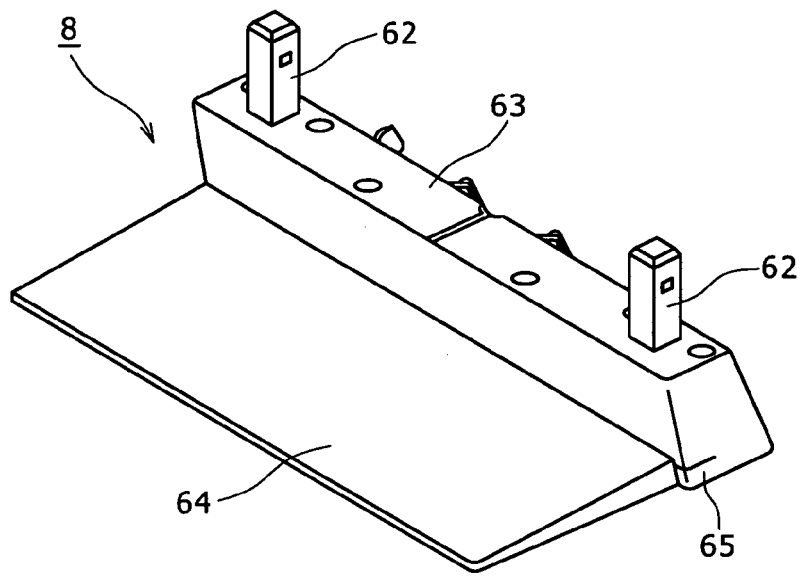
FIG. 14 is a perspective view of a stand.
Figure 15:
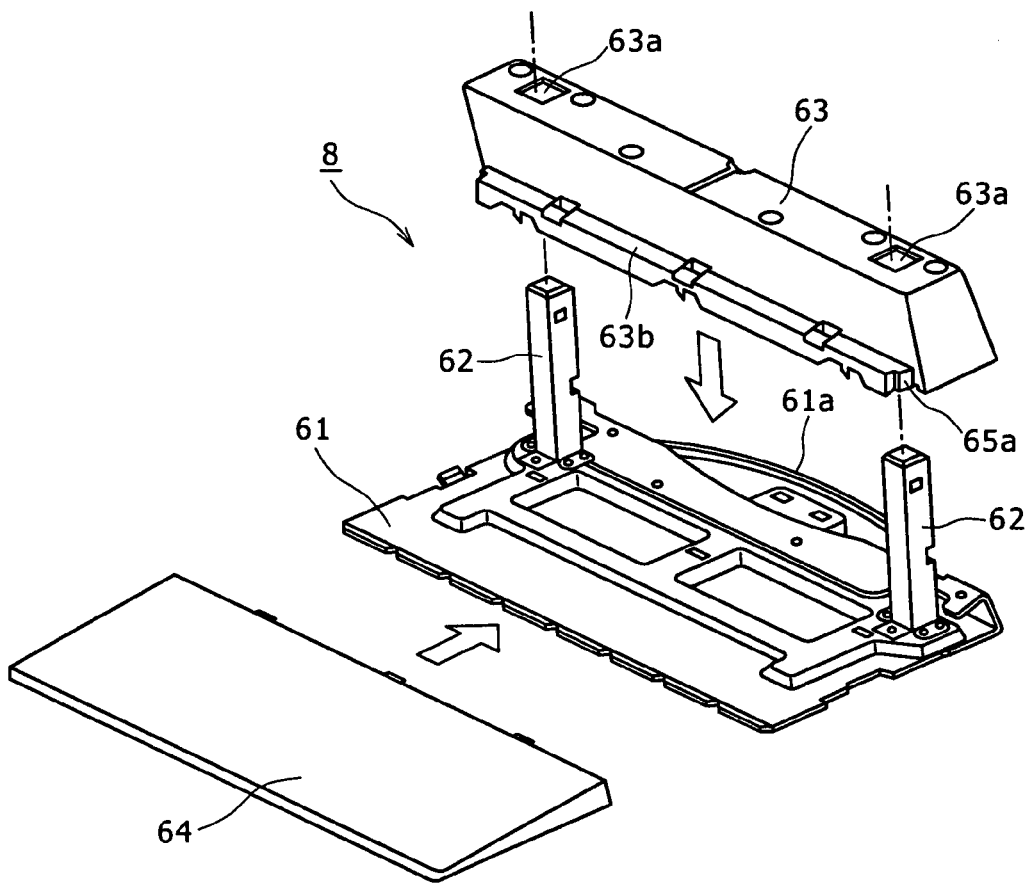
FIG. 15 is an exploded perspective view of the stand shown in FIG. 14.

The configuration of the stand 8 will now be described with reference to FIGS. 14 and 15. The stand 8 is composed of a platelike base portion 61 formed of sheet metal, two support columns 62 standing on the upper surface of the base portion 61, a fixed cover 63 for covering a rear portion of the base portion 61 including the base ends of the support columns 62, and a detachable cover 64 for covering a front portion of the base portion 61.

The base portion 61 of the stand 8 is formed of a metal plate having a suitable area capable of supporting the body portion 2 and preventing the fall of the body portion 2 to the front, rear, left, or right side thereof. The base portion 61 has substantially rectangular as a whole, and it is formed with an arcuate projecting portion 61a on the rear side. The support columns 62 stand on the upper surface of the base portion 61 at two positions near the left and right edges thereof so as to be laterally spaced apart from each other. Each support column 62 is a sectionally rectangular columnar member, and it is formed at its lower end with a plurality of outward flange portions fixed to the base portion 61 by screws. The lower ends of the two support columns 62 are covered with the fixed cover 63.

The fixed cover 63 is a hollow boxlike member opening on the lower side thereof and having a size capable of covering the vertically middle portions of the two support columns 62 to the rear portion of the base portion 61. The upper surface of the fixed cover 63 is formed with two insert holes 63a for allowing the insertion of the two support columns 62. The fixed cover 63 is mounted on the base portion 61 in such a manner that the two support columns 62 are inserted through the insert holes 63a of the fixed cover 63, and is fixed to the base portion 63 by screws. The laterally opposite ends of the fixed cover 63 in the longitudinal direction thereof are formed with a pair of locking portions 65 for engaging and locking the detachable cover 64. Each locking portion 65 includes an engagement recess 65a for engaging a part of the detachable cover 64.

The detachable cover 64 is detachably mounted to the front portion of the base portion 61. More specifically, the detachable cover 64 is a hollow thin cover member capable of covering the front portion of the base portion 61. The detachable cover 64 opens on the rear side thereof. Although not shown, this rear opening of the detachable cover 64 is formed with a pair of locking projections for respectively engaging the engagement recesses 65a of the locking portions 65 of the fixed cover 63. As shown in FIG. 15, in assembling the stand 8, the detachable cover 64 is horizontally moved in the direction of arrow until the locking projections formed at the rear opening of the detachable cover 64 come into engagement with the engagement recesses 65a of the locking portions 65 of the fixed cover 63 fixed to the base portion 61.

Each locking portion 65 is elastically deformable. Accordingly, when the detachable cover 64 is horizontally moved to a given position in its mounting operation, the locking portions 65 of the fixed cover 63 are elastically deformed in the laterally inward directions by the detachable cover 64 until the locking projections of the detachable cover 64 come into engagement with the engagement recesses 65a of the locking portions 65. As a result, the detachable cover 64 is locked to the fixed cover 63. In the case of removing the detachable cover 64, the locking portions 65 of the fixed cover 63 are elastically deformed in the laterally inward directions by the worker, so as to unlock the detachable cover 64. In this free condition of the detachable cover 64, the detachable cover 64 is drawn toward the front side. Thus, the detachable cover 64 can be removed simply. The fixed cover 63 and the detachable cover 64 are preferably formed of engineering plastics.

In the case that the stand 8 is used to support the body portion 2, the stand-included liquid crystal display television 1 as shown in FIGS. 1 and 4 is obtained. Even when it is difficult to integrally form the outer frame and the inner frame because of a large screen size (e.g., 40 inches or more), each frame can be formed so as to have a required strength for holding the display panel, and the flexible design of the mounting frame can be provided. Further, the cover frame can be changed by the user. Accordingly, by preparing color or pattern variations for the cover frame as an option, the user can simply replace the original cover frame with a preferred one without using any special tool.

In carrying the body portion 2 or the mounting frame 4, the worker may hold the rail members 17. In this preferred embodiment, however, the rail members 17 are fixed to the outer frame 11 by screws, so that there is no possibility of movement of the rail members 17 due to a shift of the center of gravity, for example, and the worker can carry at ease. Moreover, the outer edge of the outer frame 11 on which the rail members 17 are mounted is formed with the rib portions to improve the strength, so that the worker can carry safely.

It should be noted that the present invention is not limited to the above preferred embodiment, but various modifications may be made without departing from the scope of the present invention. For example, while the liquid crystal display television 1 has been described in the preferred embodiment, the present invention is applicable also to other image display devices such as a plasma display television and a projector. Further, while the framelike clear portion 20 is formed so as to surround the entire periphery of the display panel in the preferred embodiment, the shape of the clear portion in the present invention is not limited to the above. For example, the clear portion may be formed along only the upper and lower sides of the display panel or along the left and right sides of the display panel. As another modification, the clear portion may be formed along only any three sides or one side of the four sides of the display panel. Further, the clear portion may be designed so that transparent portions are intermittently arranged.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An image display device comprising:
   a display panel having a flat display surface;
   a mounting frame having an opening for mounting said display panel in the condition that said display surface is exposed to said opening, said mounting frame having an outer transparent portion and an inner opaque portion; and
   a cover frame for covering at least the boundary between said transparent portion and said opaque portion of said mounting frame;
   at least a part of said transparent portion of said mounting frame being opposed to at least a part of the periphery of said display panel, thereby forming a clear portion allowing the vision to the rear side of said display panel.

2. The image display device according to claim 1, wherein said clear portion has a framelike shape continuously surrounding the periphery of said display panel.

3. The image display device according to claim 1, wherein said mounting frame comprises:
   an outer frame formed of a transparent material to thereby form said transparent portion; and
   an inner frame detachably mounted on said outer frame and formed of an opaque material to thereby form said opaque portion;
   said outer frame and said inner frame being combined to cover a part of said transparent portion with said opaque portion, thereby forming said clear portion by the remaining part of said transparent portion.

4. The image display device according to claim 1, wherein said mounting frame comprises:
   a single frame member formed of a transparent synthetic resin; and
   an opaque synthetic resin by two-color molding;
   said clear portion being formed from said transparent synthetic resin, whereas the remaining portion being formed from said opaque synthetic resin.

5. The image display device according to claim 1, wherein said mounting frame comprises a single frame member formed of a transparent synthetic resin;
   said clear portion being formed from said transparent synthetic resin, whereas the remaining portion being coated with an opaque coating material.

6. The image display device according to claim 3, wherein at least one of said outer frame and said inner frame is formed with a speaker mounting portion for mounting a speaker unit having at least one speaker element.

7. The image display device according to claim 6, wherein the front surface of said cover frame is substantially entirely formed with numerous fine through holes at a portion corresponding to said speaker element for allowing the pass of sounds generated from said speaker element and numerous fine blind holes opening to only the front surface of said cover frame at the remaining portion where said through holes are not formed.

8. The image display device according to claim 1, wherein said cover frame is fixedly mounted to said mounting frame.

9. The image display device according to claim 1, wherein said cover frame is detachably mounted through fastening means to said mounting frame.

10. The image display device according to claim 9, wherein said fastening means comprises an elastic bushing fixed to one of said cover frame and said mounting frame and an engaging projection formed on the other of said cover frame and said mounting frame for detachably engaging said elastic bushing.

11. The image display device according to claim 1, wherein the outer edge of said mounting frame is formed with a rib portion for reinforcement; and
    a rail member is mounted on the outer edge of said mounting frame reinforced by said rib portion, said rail member being fitted to said rib portion extending along the outer edge of said mounting frame;
    the outer edge of said mounting frame being hemmed by said rail member.

12. The image display device according to claim 3, wherein the outer edge of said outer frame is formed with a rib portion for reinforcement; and
    a rail member is mounted on the outer edge of said outer frame reinforced by said rib portion, said rail member being fitted to said rib portion extending along the outer edge of said outer frame;
    the outer edge of said outer frame being hemmed by said rail member.

\* \* \* \* \*